(12) United States Patent
Berger et al.

(10) Patent No.: US 7,896,190 B2
(45) Date of Patent: Mar. 1, 2011

(54) COMPOSITES HAVING AN IMPROVED RESISTANCE TO FATIGUE

(75) Inventors: Elisabeth J. Berger, Farmington Hills, MI (US); John N. Owens, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 11/764,493

(22) Filed: Jun. 18, 2007

(65) Prior Publication Data

US 2008/0015305 A1 Jan. 17, 2008

Related U.S. Application Data

(60) Provisional application No. 60/807,516, filed on Jul. 17, 2006.

(51) Int. Cl.
*F17C 1/06* (2006.01)
(52) U.S. Cl. .............. 220/589; 524/502; 524/505; 525/93
(58) Field of Classification Search .......... 524/548, 524/502, 505; 202/589; 525/93; 220/581–592
See application file for complete search history.

(56) References Cited

U.S. PATENT DOCUMENTS

| | | | |
|---|---|---|---|
| 4,076,869 A * | 2/1978 | Flynn ................ 427/386 |
| 5,593,770 A * | 1/1997 | Mumford et al. ............ 442/327 |
| 6,835,394 B1 | 12/2004 | Discher et al. |
| 6,887,574 B2 | 5/2005 | Dean et al. |
| 6,902,811 B2 * | 6/2005 | Oosedo et al. .............. 428/413 |
| 2004/0052997 A1 * | 3/2004 | Santo ........................ 428/36.3 |
| 2005/0048110 A1 | 3/2005 | Discher et al. |

OTHER PUBLICATIONS

Franzky, Shannon, "High-pressure 825 bar hydrogen storage", Fuel Cells Bulletin, Sep. 2002, pp. 9-10.*
Wu, Junxian, "Structure and Properties of PBO-PEO Diblock Copolymer Modified Epoxy", Journal of polymer Science; Part B: Polymer Chemistry, Volu. 43, pp. 1950-1965, available online Jun. 21, 2005.*
Lasher et al, Comparison of On-Board Hydrogen Storage Options, Fuel Cell Seminar, Nov. 14-18, 2005.*
Junxian Wu, et al, Structure and Properties of PBO-PEO Diblock Copolymer Modified Epoxy, Journal of Polymer Science, vol. 43, 1950-1965 (2005) Wiley Periodicals, Inc.
John A. Eihusen, Application of Plastic-Lined Composite Pressure Vessels for Hydrogen Storage, General Dynamics Armament and Technical Products, Lincoln, Nebraska 68504-1197.
Hydrogen, Fuel Cells, and Infrastructure Technologies, FY 2002 Progress Report, Section III. Hydrogen Storage, pp. 199-225.

\* cited by examiner

*Primary Examiner*—Vasu Jagannathan
*Assistant Examiner*—Doris L Lee
(74) *Attorney, Agent, or Firm*—Reising Ethington P.C.

(57) ABSTRACT

Compositions including a base resin, a reinforcement and a modifier including a block copolymer for producing vesicles, spherical and/or cylindrical micelles and composites made therefrom.

15 Claims, 3 Drawing Sheets

COMPOSITES HAVING AN IMPROVED RESISTANCE TO FATIGUE

CROSS-REFERENCE TO RELATED APPLICATIONS

This application claims the benefit of U.S. Provisional Application No. 60/807,516 filed Jul. 17, 2006.

TECHNICAL FIELD

The field to which the disclosure generally relates includes products including a composite having an improved resistance to fatigue, composite compositions and methods of making and using the same.

BACKGROUND OF THE INVENTION

A variety of products have been made using both thermoplastic and thermoset materials that include a reinforcement such as carbon fibers.

Epoxy resin materials including fillers and reinforcements, such as glass or carbon fibers, have been utilized to make a variety of structural products including composite components for automotive vehicles, boats, planes and the like. Epoxy materials with carbon fibers have also been utilized to make high pressure gas storage tanks for a variety of applications, including for use in onboard storage of hydrogen for automotive vehicles. In a variety of these applications, the polymeric materials may be subjected to static and cyclic or dynamic stresses which induce fatigue and sometimes failure of the materials for their intended application. However, epoxy resins can be brittle, and ways of toughening them without sacrificing other properties are sought. Further, the use of carbon fibers in these composite products is relatively expensive.

Wu, et al., "Structure and Properties of PBO-PEO Diblock Copolymer Modified Epoxy", Journal of Polymer Science: Part B: Polymer Chemistry, Volume 43, 1950-1965 (2005) discloses a method of making a two-part epoxy including a block copolymer for producing vesicle, and spherical and cylindrical (worm-like) micelles. In this method, a PBO-PEO block copolymer is dissolved in acetone, and then epoxy resin and phenol novolac curing agent are added to the solution. The acetone is evaporated, and the epoxy/curing agent/block copolymer mix was cast into a plaque mold and cured. No fibers or other reinforcements were added to these plaques.

The plaques were found to have greatly enhanced toughness compared to neat resin/curing agent plaques, with little loss in other properties.

SUMMARY OF THE INVENTION

One embodiment of the invention includes a product including a composite material including a base polymeric material and a reinforcement. A modifier is included having a plurality of microstructures including at least one of vesicles, worm-like micelles or spherical micelles.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

DESCRIPTION OF THE DRAWINGS

Exemplary embodiments of the present invention will become more fully understood from the detailed description and the accompanying drawings, wherein.

DETAILED DESCRIPTION OF AN EXEMPLARY EMBODIMENT

The following description of the embodiment(s) is merely exemplary in nature and is in no way intended to limit the invention, its application, or uses.

One embodiment of the invention includes a composition including a base resin, a reinforcement, and a modifier. The base resin may include monomers or prepolymers for making a thermoset resin. In one embodiment of the invention, the base resin includes an ether of bisphenol-A. A suitable base resin material is an epoxy available from Dow Chemical Company under the trade name DER 383. The composition may further include a curing agent such as phenol novolac (PN). The base resin material may include monomers and prepolymers that are polymerized to form a thermoset matrix. In other embodiments of the invention, the base resin may be a resin such as polyurethane or vinyl ester or other thermoset resins.

In one embodiment of the invention, the reinforcement may include particles or fibers of reinforcement materials such as glass, carbon or Kevlar®. In one embodiment of the invention, the modifier may include a block copolymer diluted with a bisphenol-A-based resin. In one embodiment, the block copolymer may include poly(ethylene oxide-b-ethylene propylene) (PEO-PEP). In another embodiment of the invention, the modifier may include an alternative block copolymer of poly(butylene oxide-b-ethylene oxide) (PBO-PEO). The modifier may be present in amounts ranging from 0.5% to 10%, and preferably less than or equal to 5% by weight.

When relatively dilute amounts of the modifier are added to the base resin, the resultant two-component system including amphiphile (e.g., block copolymer) and diluent (e.g., epoxy) may contain one or more of three dispersed morphologies: spherical and cylindrical (worm-like) micelles, and/or vesicles (bilayers). The presence of the spherical, cylindrical (worm-like) micelles and/or vesicles improves the toughness of the base resin (e.g., epoxy).

The composition as described above is particularly useful in making composites for products which are subject to static or dynamic fatigue. It is believed that failure in fatigue is partially initiated by microcracking in the base resin. The inclusion of a modifier to the base resin will improve the toughness of the base resin, thereby decreasing the microcracking which leads to fatigue failure, and/or allow for a decreased usage of expensive components, such as carbon fibers.

Figure 1:
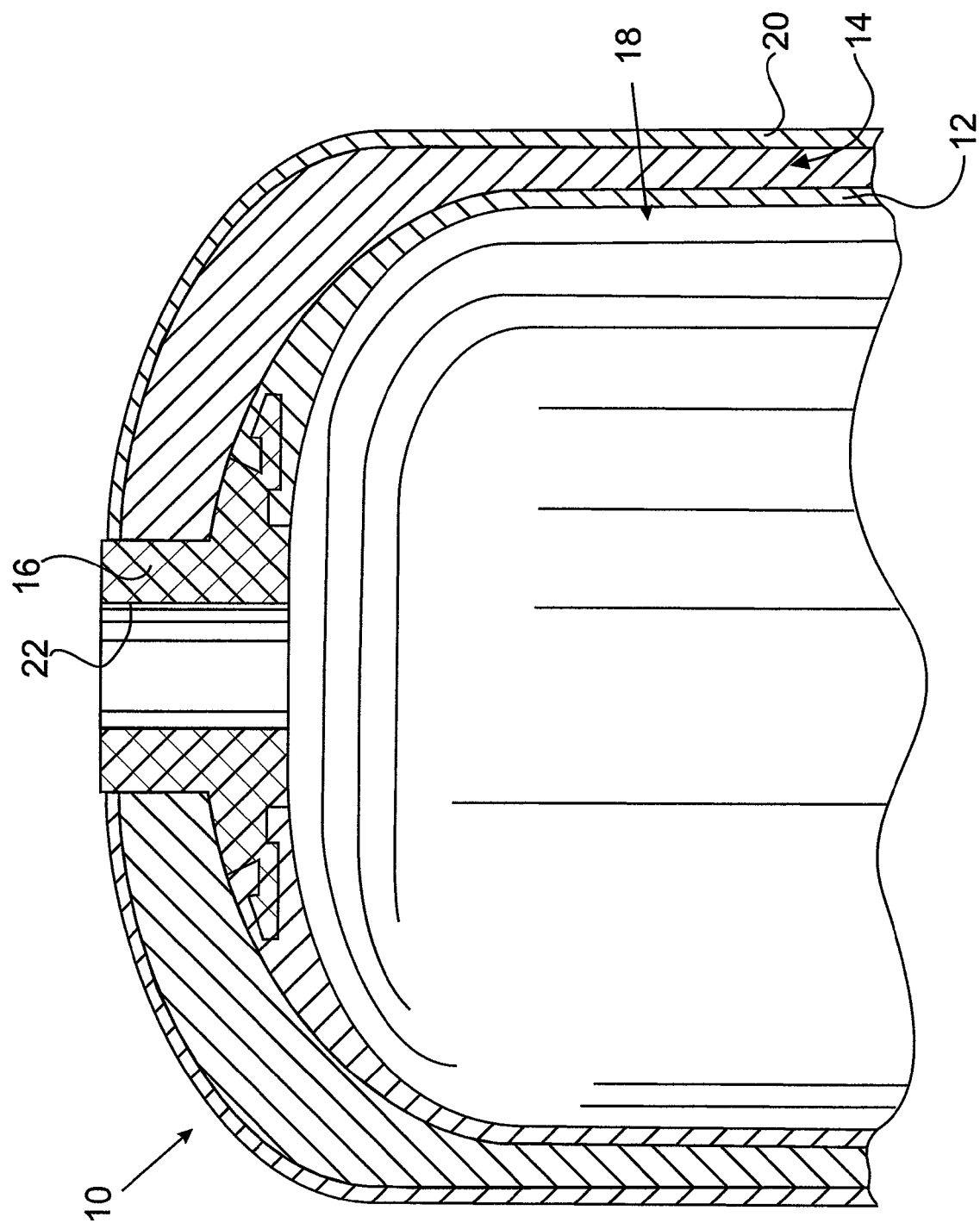
FIG. 1 illustrates a product according to one embodiment of the invention.
Figure 2:
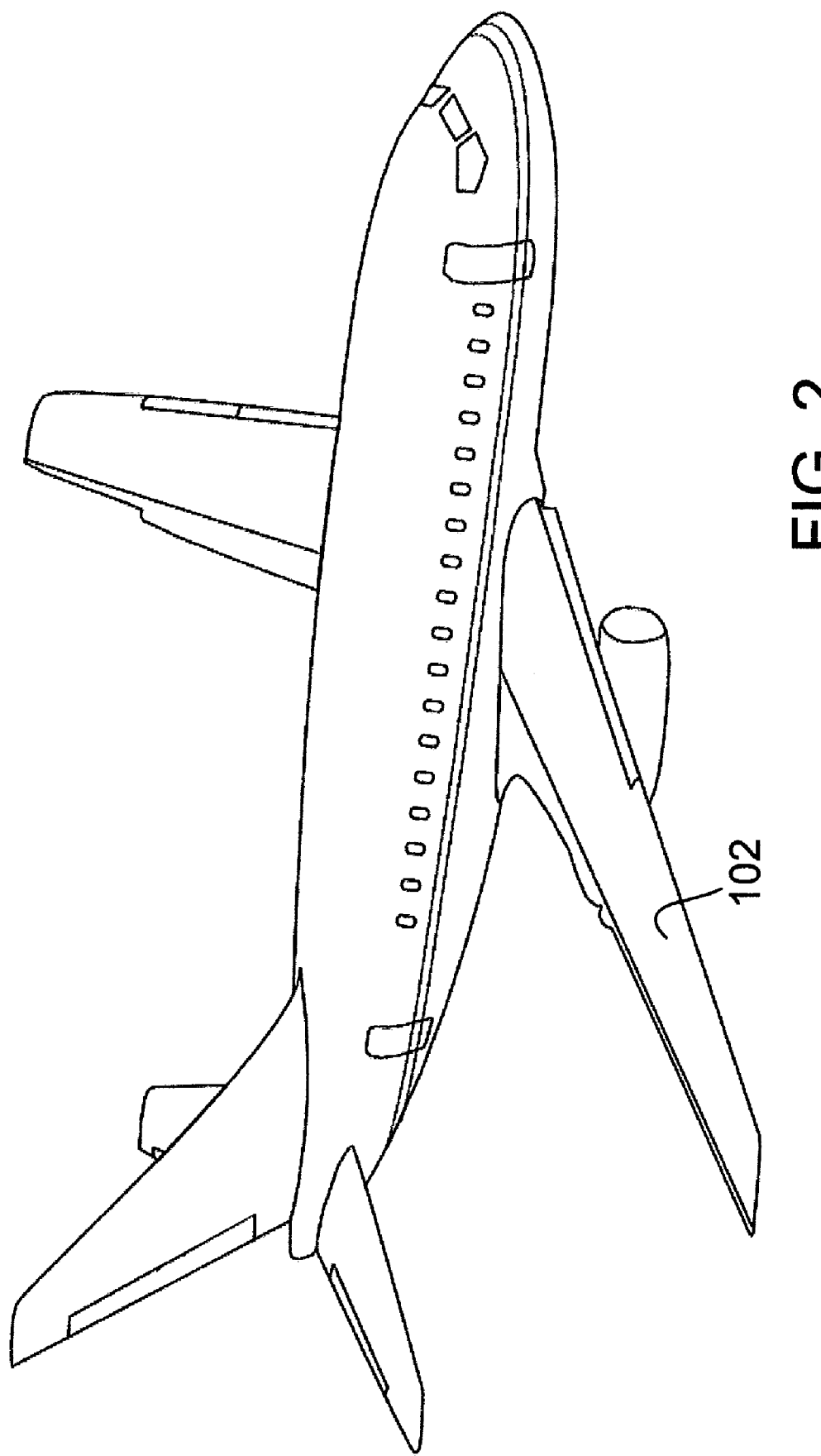
FIG. 2 illustrates a product according to one embodiment of the invention.
Figure 3:
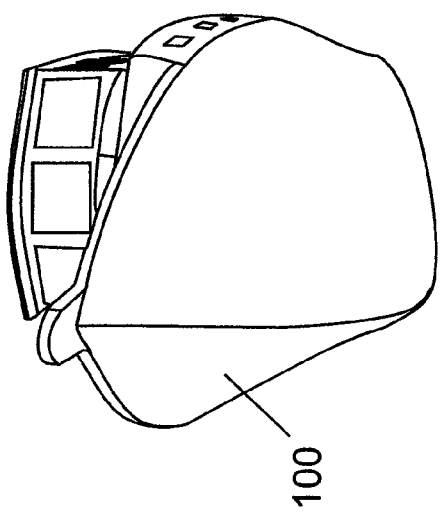
FIG. 3 illustrates a product according to one embodiment of the invention.
Figure 4:
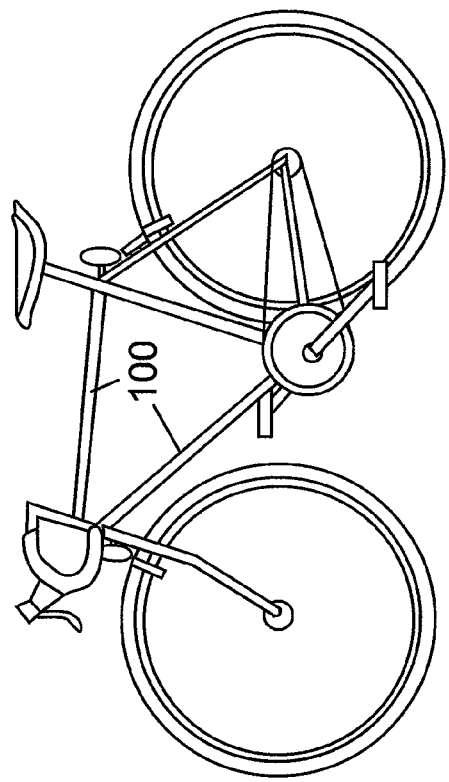
FIG. 4 illustrates a product according to one embodiment of the invention.

In one embodiment of the invention, the composition is utilized to make a portion of a high-pressure hydrogen storage tank for use in fuel cell applications. As shown in FIG. 1, such a high-pressure hydrogen storage tank 10 may include a first layer as inner liner (high-pressure gas barrier) 12, such as, high-density polyethylene (HDPE). A second layer 14 is provided over the first layer 12. The second layer 14 includes an epoxy impregnated carbon and/or glass fiber material, and wherein the epoxy includes a block copolymer modifier. Such a hydrogen storage tank may be used to repeatedly fill, store and discharge hydrogen, at storage pressure of 5000 psi, 10,000 psi, and above, for example. A metal boss 16 may be provided for filling the tank cavity 18 with a gas such as hydrogen. Optionally, a protective outer layer 20 may be provided over the composite (second layer 14).

The composites as described above may be used for structural components subjected to static or dynamic stresses, such as, but not limited to, high pressure gaseous storage tanks, structure component 100 and panels 102 for vehicles such as airplanes, automobiles (cars and trucks), structure components of bicycles or trailers for large trucks. Automotive components which may be made of the composite may include, but are not limited to, frame or unibody structures, fuel tanks, or chassis components.

While the invention is not limited by theory, it is believed that the inclusion of a block copolymer modifier to the base resin increases the material toughness by retarding the propagation of microcracking in a composite made of the base resin. In the case of a composite including vesicles as microstructures, it is believed that the propagation of microcracking is retarded by energy being absorbed through the vesicle dilation and interfacial failure (debonding) from the base resin material. In the case of composites including spherical and cylindrical micelles, it is believed that the energy absorption begins with cavitation of the micelles. Apparently, nanoscale cavitation and interfacial delamination are capable of diverting the local stress field resulting in crack deflection.

Wu, et al., "Structure and Properties of PBO-PEO Diblock Copolymer Modified Epoxy", Journal of Polymer Science: Part B: Polymer Chemistry, Volume 43, 1950-1965 (2005), the disclosure of which is hereby incorporated by reference, discloses a method of making a two-part epoxy including a block copolymer for producing vesicle, and spherical and cylindrical (worm-like) micelles which may be used in embodiments of the invention. Reinforcements, such as carbon and/or glass based fibers, may be added to such a block copolymer epoxy to make a variety of products according to various embodiments of the invention.

In a variety of embodiments of the invention, the toughening of the composite by incorporating a plurality of vesicles, spherical or cylindrical micelles is particularly advantageous when the product is used or subjected to conditions that have the potential to fatigue the composite (i.e, fatigue limiting application). The incorporation of a plurality of vesicles, spherical or cylindrical micelles into the composite provides fatigue resistance. For example, the toughening method using a plurality of vesicles, spherical or cylindrical micelles is particularly useful in making high pressure hydrogen gas storage tanks (2,000-10,000 psi and greater) that operate under conditions that might induce fatigue such as repeated thermal cycling or repeat filling and discharge of the storage tank. Composite components of boat, planes, vehicles, and bicycles that are subject to conditions that are potentially fatigue inducing may be improved by incorporating a block copolymer capable of producing vesicle, spherical or cylindrical micelles.

The above description of embodiments of the invention is merely exemplary in nature and, thus, variations thereof are not to be regarded as a departure from the spirit and scope of the invention.

What is claimed is:

1. A hydrogen gas storage tank that defines a tank cavity, the hydrogen gas storage tank comprising:
    a composite layer comprising an epoxy resin matrix, a reinforcement, and a plurality of block copolymer vesicles, spherical or cylindrical micelles in an amount sufficient to improve a fatigue resistance of the resin matrix by retarding microcracking;
    a polymeric layer coupled onto said composite layer and in communication with said tank cavity; and
    a protective outer layer coupled over said composite layer such that said composite layer is between said protective outer layer and said polymeric layer.

2. A hydrogen gas storage tank as set forth in claim 1 wherein the reinforcement comprises fibers comprising at least one of carbon or silicon dioxide-based glass.

3. A hydrogen gas storage tank as set forth in claim 1 wherein the epoxy resin matrix comprises a copolymer of diglycidyl ether of bisphenol-A, and wherein the plurality of block copolymer vesicles, spherical or cylindrical micelles comprise poly(ethylene oxide-b-ethylene propylene).

4. A hydrogen gas storage tank as set forth in claim 1 wherein the epoxy resin matrix comprises a copolymer of diglycidyl ether of bisphenol-A, and wherein the plurality of block copolymer vesicles, spherical or cylindrical micelles comprise poly(butylene oxide-b-ethylene oxide).

5. A hydrogen gas storage tank as set forth in claim 1 further comprising hydrogen gas in the gas storage tank at a pressure of 5,000 psi or greater.

6. A hydrogen gas storage tank as set forth in claim 1 further comprising hydrogen gas in the gas storage tank at a pressure of 10,000 psi or greater.

7. A hydrogen gas storage tank as set forth in claim 1 constructed and arranged in an application that subjects the hydrogen gas storage tank to fatigue and wherein the plurality of block copolymer vesicles, spherical or cylindrical micelles provide the improved fatigue resistance.

8. A hydrogen gas storage tank as set forth in claim 1 wherein the polymeric layer comprises high-density polyethylene.

9. A hydrogen gas storage tank as set forth in claim 1 wherein the amount of the plurality of block copolymer vesicles, spherical or cylindrical micelles is sufficient to toughen the resin matrix.

10. A hydrogen gas storage tank as set forth in claim 1 wherein the reinforcement comprises silicon dioxide-based glass fibers.

11. A method comprising the steps of:
    providing a hydrogen gas storage tank that defines a tank cavity, the hydrogen gas storage tank comprising:
    a composite layer comprising an epoxy resin matrix, a reinforcement, and a plurality of block copolymer vesicles, spherical or cylindrical micelles in an amount sufficient to improve a fatigue resistance of the resin matrix by retarding microcracking;
    a polymeric layer coupled onto said composite layer and in communication with said tank cavity;
    and a protective outer layer coupled over said composite layer such that said composite layer is between said protective outer layer and said polymeric layer, and subjecting the composite layer to dynamic stresses.

12. The method of claim 11, wherein the dynamic stresses are applied from pressurized hydrogen gas within the gas storage tank.

13. The method of claim 11, wherein the step of subjecting the composite layer to dynamic stresses includes the repeated steps of filling and discharging the hydrogen gas storage tank.

14. The method of claim 11, wherein the dynamic stresses are applied from repeated thermal cycling.

15. The method of claim 13, wherein at least some of the repeated steps of filling include filling the hydrogen gas storage tank to a pressure of 5000 psi or greater.

\* \* \* \* \*